United States Patent [19]

Weng

[11] Patent Number: 4,884,175
[45] Date of Patent: Nov. 28, 1989

[54] TIRE-PRESSURE AND DEPTH GAUGE WITH ILLUMINATION COMPONENT

[76] Inventor: Hsi-Kuang Weng, 2nd Fl., No. 29, Wu Cheng Street, Ban Chyan, Taipei Hsien, Taiwan

[21] Appl. No.: 206,424

[22] Filed: Jun. 14, 1988

[51] Int. Cl.$^4$ .................... B25K 23/18; B60C 23/02
[52] U.S. Cl. ..................... 362/119; 362/29; 362/116; 73/146.8; 73/744
[58] Field of Search ............ 362/26, 28, 29, 30, 362/109, 116, 119, 120, 253; 73/146.8, 714, 744; 137/227, 228

[56] References Cited

U.S. PATENT DOCUMENTS 3,113,460  12/1963  Wrenn ........................ 73/744
4,495,551  1/1985  Foltz ........................... 362/204
4,526,030  7/1985  Vecera ....................... 73/146.8

FOREIGN PATENT DOCUMENTS 1020623  11/1952  France ........................ 362/120
842769   7/1960  United Kingdom ......... 362/120
1413115  11/1975  United Kingdom ......... 73/146.8

Primary Examiner—Ira S. Lazarus
Assistant Examiner—David G. Messer
Attorney, Agent, or Firm—Asian Pacific International Patent & Trademark Office

[57] ABSTRACT

The device includes check-up of tire-pressure, depth of tire tread, and illumination components. The device is small, and hence affords drivers the facility of portability, for example, at a key ring.

4 Claims, 5 Drawing Sheets

TIRE-PRESSURE AND DEPTH GAUGE WITH ILLUMINATION COMPONENT

BACKGROUND OF THE INVENTION

Nowadays, automobiles are almost indispensible tools. All but heavy equipment or rail-type cars have tires, which allow a more comfortable transportation and have a higher brake efficiency, provided that the proper tire pressure is maintained and the degree of tread abrasion is monitored to ensure safety.

Usually, a tire check-up is done in a garage. In case the car owners are too busy or lazy to maintain their cars, accidents may result simply because of tire defects due to loss of control of cars. It is, therefore, especially important to periodically maintain tire pressure of automobiles and to monitor wear of tire treads.

Currently used devices for measurement of the tire pressure and tread depth are tire pressure gauges and tread depth measuring devices, which are used independently. Sometimes, owing to inconvenience or a user's careless mistake, only one is used. Thereby, the attendant risk is enhanced.

The inventor has been engaged in the production of the two measuring devices for several years and due to experiences gained during long distance driving, the inventor as a result has considerable experiences in tire maintenance. Such past experiences have confirmed the importance of periodic check-up of the tire pressure and tread depth, which are closely related and are vital for the sake of safety.

To eliminate the mentioned drawbacks, a portable pressure gauge and tread depth measuring device has been designed, which enables drivers to accomplish tire check-up within one minute, and thereby to preclude corresponding accidents. Moreover, this invention also comprises a flashlight, permitting a driver to carry out a tire check-up at night and under dim light conditions.

SUMMARY OF THE INVENTION

This invention relates to a combination device which comprises a tire pressure gauge, a tread depth measuring device, and an illumination device. This device is small, convenient for carrying it, cheap in cost, and also simple in structure. It is primarily composed of a compact body which is separated into two parts, one being the battery housing, another being a cylinder which has a scale, spring and piston installed inside and a nozzle on its top.

In one embodiment of this invention, the compact body consists of two vertically arranged parallel chambers. Installed in one chamber are common elements of a pressure gauge and tread measuring device, including a piston, a spring, a scale and a base, whereas installed in the other chamber are elements of a flashlight, including a transparent lamp shade, a bulb, a metal ring, a metal cylinder, a cover, cells, and a conductive clip which when pressed, will touch the metal cylinder and trigger the lighting of the bulb. The assembly possesses the feature of being small and convenient for carrying it and having three powerful functions.

In another embodiment of this invention, a nozzle is installed at the chamber for the pressure gauge and tread depth measuring device, which when directly connected to the tire nozzle jet or valve, measures the tire pressure or inflation pressure by means of the reaction force of the spring and piston against the tire pressure, which will be indicated on a scale.

In a further embodiment, the scale has a slender rod at one end, and the transparent lamp shade is hollow with a conic interior broadening towards the bottom end, facilitating the pushing out of the scale with fingers. A zero reading is indicated when the scale end is at the level of the cylinder end. Then it is pushed out, using its slender rod to measure the tread depth.

In an additional embodiment, when the conductive clip of the illumination component is held and pressed, a circuit is closed, and the bulb lightens, with the illumination component being capable of being used independently according to necessity or for lighting of the scale.

In one embodiment, a key ring and hence keys can be fitted on the assembly, facilitating the taking of keys.

DETAILED DESCRIPTION

Figure 1:
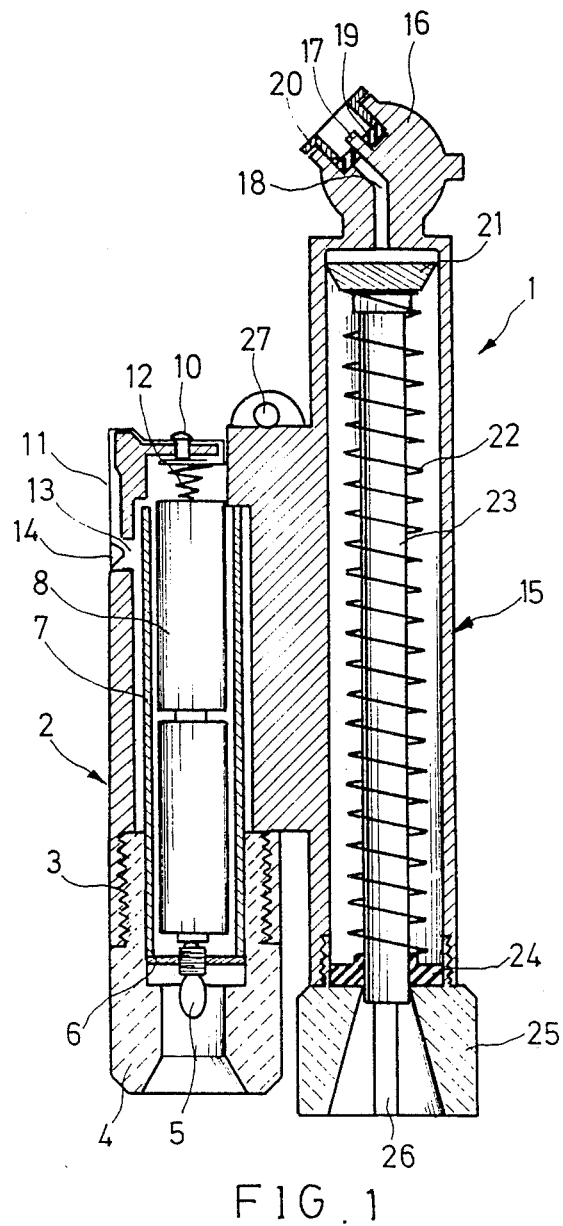
FIG. 1 is the longitudinal sectional view of an embodiment of this invention.

Because of the practical need, this device is designed for and accomplishes several improvements. Thus, this device can provide a multi-functional tire check-up, which can work at day, or at night with illumination, for measurement of tire pressure and tread depth. This invention is described in detail with reference to the drawing figures; and in FIG. 1, an embodiment of this invention is shown which is comprised of a compact body 1 which has two vertical and parallel chambers. Installed in the left chamber 2, which is a hollow cylinder having threads 3 at the lower inner wall, are a transparent lamp shade, a small bulb 5 inside shade 4, the bulb being screwed to a metal ring 6. A metal cylinder 7 is fitted on ring 6. One or two small cells 8 are arranged in the metal cylinder 7, and cover 9 closes the top of cylinder 2. By means of a fastener 10, the cells 8 are anchored with a spring 12; a conductive clip 11 is flexible, extending from spring 12 to the right side of left chamber 2. In the wall of the left chamber is an opening 13 for penetration of a small protrusion 14 of the conductive clip 11 to touch the metal cylinder 7 when clip 11 is held and pressed, so that the cell cathode can be connected through spring 12, conductive clip 11, metal cylinder 7 and metal ring 6 to the negative pole of bulb 5, and then through the bulb's positive pole to the cell's anode.

The right chamber is a hollow cylinder with a nozzle 16 at the top. The nozzle 16 has a protrusion 17, an adjacent slot 18 which connects to the right chamber 15, a pad 19 and an annular edge or sleeve 20, both of which aim for anchorage of protrusion 17 and edge 20.

Inside the right chamber 15 are a piston 21, a spring 22 and a rectangular scale 23, in which the piston 21 is linked to the spring 22, and a scale 23 is fitted inside spring 22. The scale 23 can be used to take two readings, for measurement of pressure and tread depth. A ring block 24 is screwed tightly to the bottom of cylinder 15 by a transparent base 25 which is hollow and the conic chamber is broadening towards the free end so that scale 23 can be moved in or pulled out by fingers. In addition, the fit between ring block 24 and scale 23 allows some motion but precludes inadvertent sliding.

A protrusion between the two chambers 2 and 15 has a hole 27 which enables the attachment to a key ring.

Figure 2:
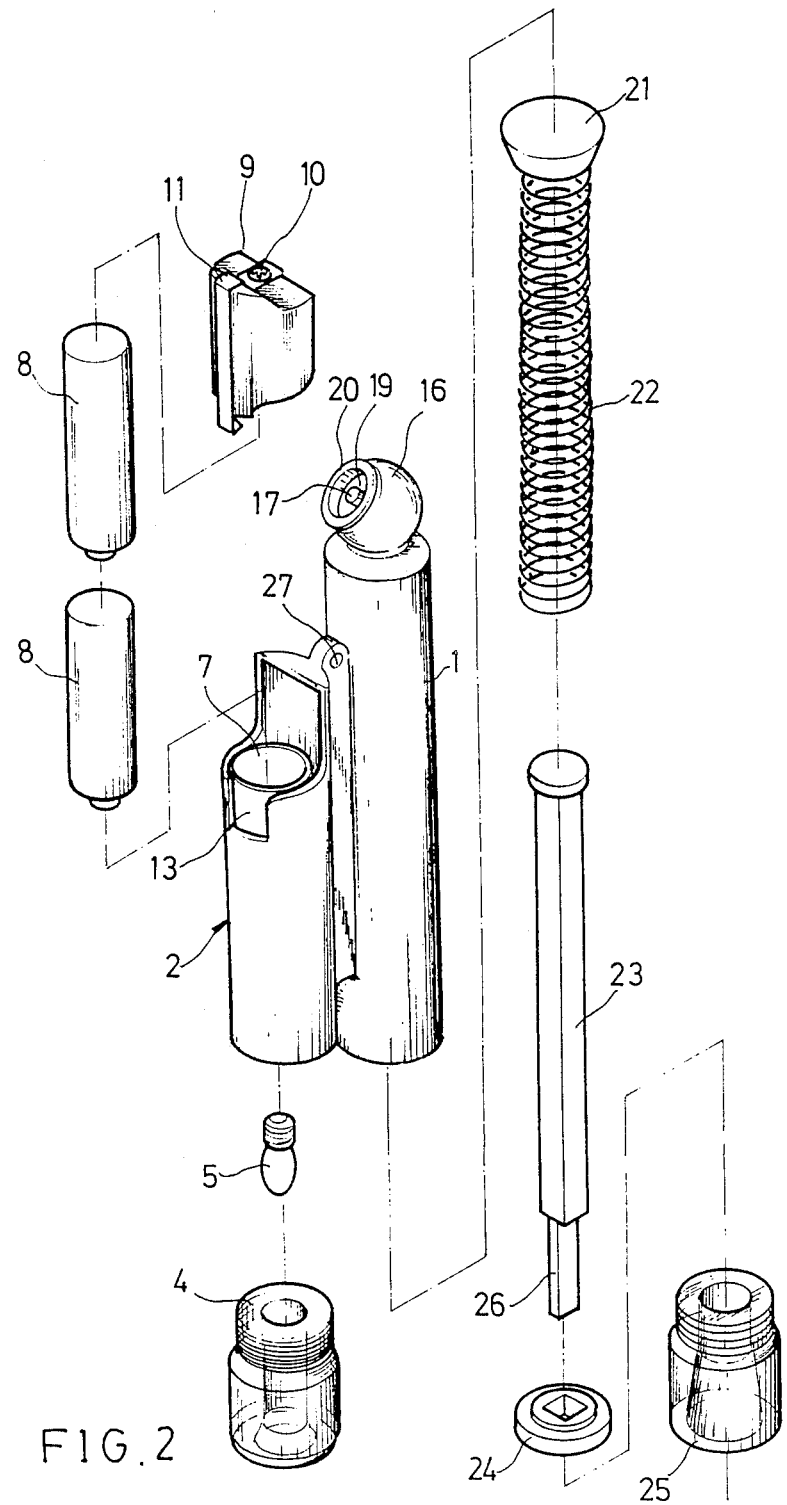
FIG. 2 is an exploded perspective view of the embodiment of this invention.

Referring to FIGS. 1 and 2, body 1 has two vertically parallel chambers 2 and 15, and connected to the right chamber 15 is a nozzle formation 16 which has a protrusion 17. Around the protrusion 17 extends a soft pad 19 and then the ring edge or sleeve member 20. The conic piston 21 is connected with its lower end to the spring 22 which surrounds the rectangular scale 23. The lower end of scale 23 includes a slender rod 26. Ring block 24 and transparent base 25 are fastened to the bottom of cylinder 15 in which the ring block 24 is used to restrict spring 22. A zero setting is attained when the bottom end of rod 26 of scale 23 is at the same level as the bottom end of transparent base 25.

The left chamber 2 of compact body 1 comprises illumination elements, including the transparent shade 4 which houses small bulb 5 inside, and the metal ring 6 is screwed to bulb 5. The combined part is screwed to the bottom of cylinder 2. Also installed in the left chamber 2 is the metal cylinder 7, for housing one to two cells 8. Spring 12 and conductive clip 11 are locked to the cover 9 by the fastener 10, and the entire part is then locked on cylinder 2.

Figure 3:
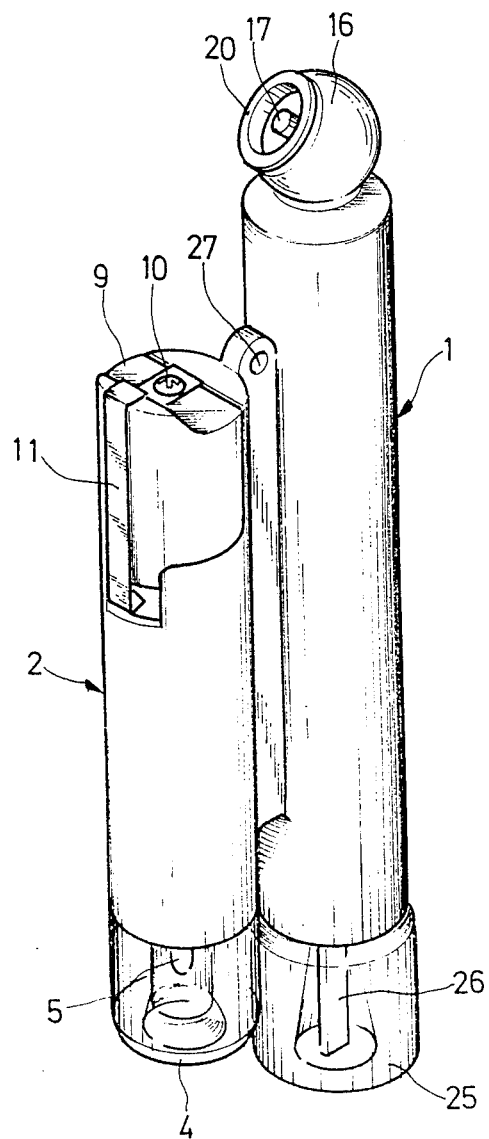
FIG. 3 is a perspective view of the embodiment of this invention.

Referring to the perspective view of FIG. 3, this figure shows the mentioned elements when assembled.

Figure 4:
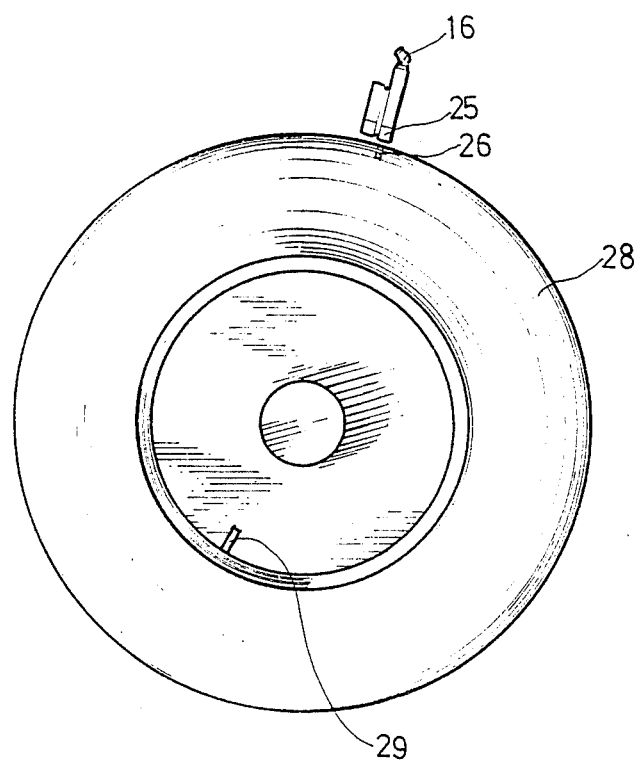
FIG. 4 is an illustrative diagram of the use of this invention at measuring tire tread.

With reference to FIG. 4, at a tire 28 is provided a nozzle jet or valve 29 which when connected to nozzle 16 of the device of this invention enables the measurement of tire pressure. The slender rod 26 of scale 23 can be pushed out and introduced deep into the tread 30 (FIG. 5) until it touches the tire surface, and thereby the tread's depth can be determined.

Figure 5:
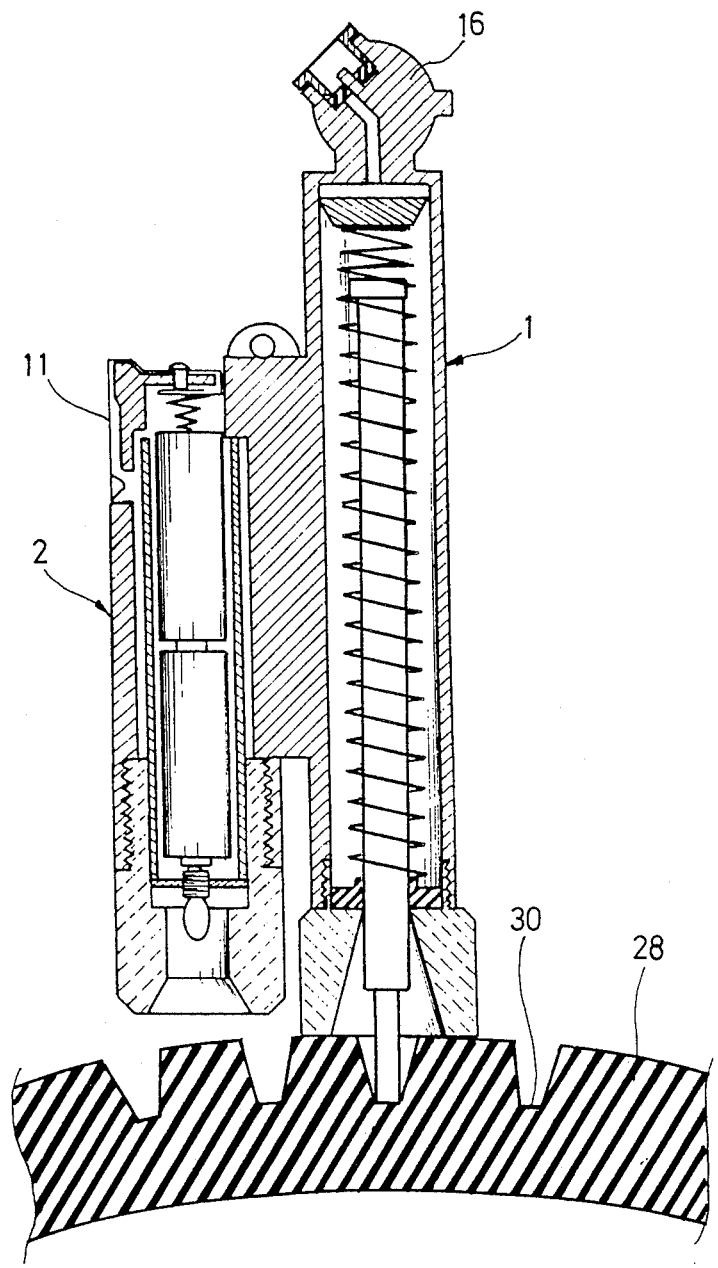
FIG. 5 is a sectional view of the use of the device at measuring tire tread.

From parallel of the cross-sectional view of FIG. 5, one can clearly see how the tread depth is estimated.

This device is combination tire-pressure and gauge for tread-depth measuring with an illumination device. It is small and convenient to carry. In case one wishes to determine the tire pressure, one only needs to push back the scale until its top touches the piston 21, and to press the nozzle 16 against the tire valve 29, which is pushed open and air discharges from the tire to the gauge. At equilibrium, an equal and opposite force is generated by spring 22 which is pushed by piston 21 due to the pressure, and the scale 23 is also pushed out. Thus, the tire pressure can be measured by reading the scale 23.

For determination of the tread depth, the scale 23 is pushed out and introduced into the treads until the slender rod 26 touches the tire surface, and on reading of the pulled-out rod part 26, we can estimate the tread depth.

In case this device is used at night, by pressing the conductive clip 11, the circuit is closed and thus bulb 5 lightens. Hence, it can be used for illumination.

In conclusion, this device is small and convenient for carrying, and simple in operation. Moreover, it can work at day or night, and allows attachment to a key ring with keys, and provides a very practical product.

What is claimed:

1. A combination device with components for determining the tire pressure, the depth of tread of a tire, and for illumination, comprising:
    a compact housing body defining first and second hollow chambers of cylindrical configuration, said second hollow chamber defining a threaded portion, and said housing having a formation providing an aperture for a respective key ring;
    a nozzle formation provided at said first hollow chamber, said nozzle formation being in conformity with a tire valve and said nozzle formation including a bottom, a protrusion adapted to actuate a valve stem of a tire valve and an adjacent slot connecting said nozzle formation to said first hollow chamber;
    a pad located at said bottom about said protrusion;
    a sleeve member providing an annular edge forwardly of said nozzle formation and in contact with said pad;
    a conical piston arranged in said first chamber; a first spring in said first hollow chamber for biasing said piston;
    a member including a scale and whose lower end comprises a slender rod for taking readings of tire pressure and tire tread depth, this member being disposed inside said first spring;
    a ring block which has a hole in the center, enabling the passage of said member, and which permits operative motion but precludes inadvertent sliding of said member;
    a transparent hollow base with an aperture for said member to extend therethrough and a recess formation of conic shape widening towards the free end of said base;
    a transparent shade which is hollow and has exterior threads at one end for connection at the threaded portion of said second hollow chamber;
    a metal ring secured at said transparent shade;
    a light bulb secured at said metal ring;
    a metal cylinder disposed in said second hollow chamber with one end adjacent said ring;
    at least one battery cell arranged in said metal cylinder between said light bulb and a respective second spring;
    a cover including a conductive clip secured by a respective fastener at that end of said metal cylinder which is opposite said end adjacent said metal ring;
    a second spring disposed between said battery and said cover; and
    a fastener for securing said cover at said second chamber;
    said bulb, said metal ring, and said metal cylinder, in said second hollow chamber providing a circuit of the illumination component, and said nozzle formation, said conical piston, said first spring, and said member including said scale respectively providing the tire pressure gauge and tread measuring components.

2. The device according to claim 1, wherein a tire pressure can be determined by directly connecting said nozzle to a tire valve for moving said member in response to tire air pressure, under biasing of said first spring, with a magnitude of tire pressure being read on said scale.

3. The device according to claim 1, wherein said ruler is pulled out and introduced into a tire tread until it touches the tire tread bottom surface, thereby to indicate the depth on said scale.

4. The device according to claim 1, wherein said conductive clip is adapted to be held and pressed by a hand of a user such that it touches said metal cylinder and closes a circuit including said at least one battery cell and said bulb for lighting said bulb.

* * * * *